Nov. 25, 1958     R. HAGEN ET AL     2,861,295
MANUFACTURE OF PLASTIC BOTTLES AND
SIMILAR HOLLOW BODIES
Filed June 7, 1955
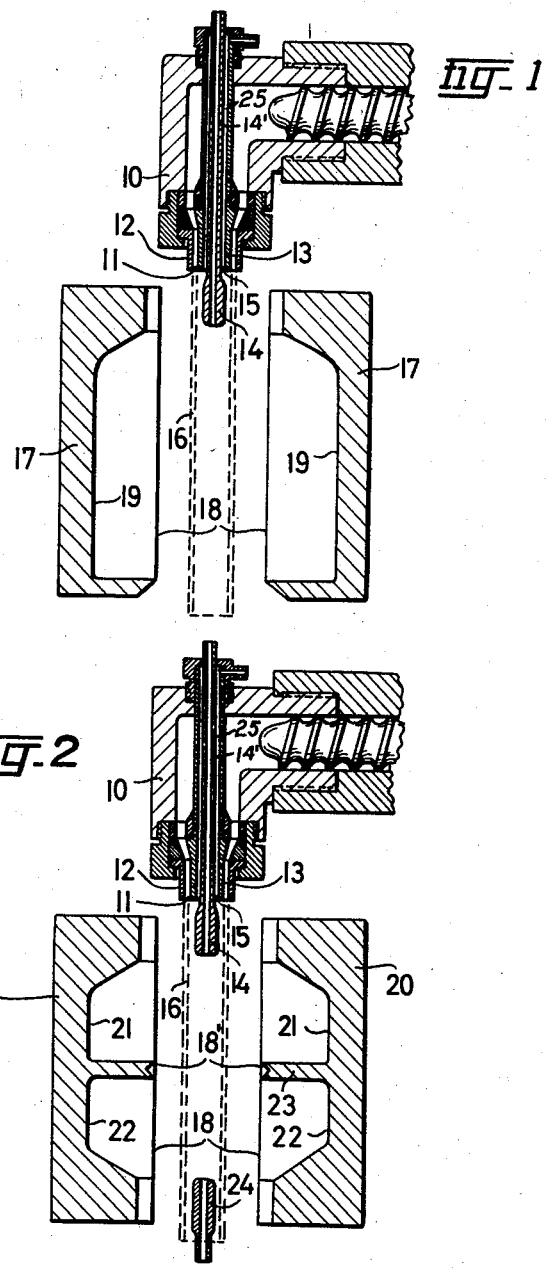
INVENTORS
Reinold Hagen, Norbert Hagen
BY

United States Patent Office 2,861,295
Patented Nov. 25, 1958

2,861,295

MANUFACTURE OF PLASTIC BOTTLES AND SIMILAR HOLLOW BODIES

Reinold Hagen and Norbert Hagen, Siegburg, Rhineland, Germany

Application June 7, 1955, Serial No. 513,851

Claims priority, application Germany June 10, 1954

5 Claims. (Cl. 18—5)

This invention relates to an apparatus for forming from plastic materials, especially thermoplastics, bottles and other containers having a neck. The starting material for our manufacture is a tube. Generally, an extrusion press with an annular extrusion nozzle is mounted above a sectional mold, preferably a two-section mold. As soon as a sufficient length of an open-ended tube is extruded into the space between the open sections of the mold, the mold sections are closed. This causes the far end of the tube to be pinched shut. At the other end, the material is pressed against a blow pipe which projects into the open mold space to act as a core to form the neck portion of the article to be produced. Compressed air or any other gaseous pressure medium is then admitted through the blow pipe to expand the pinched off segment of the tube against the wall of the mold cavity, where the formed hollow article cools off and at the same time becomes rigid.

The primary object of our present invention is to improve the manufacture of plastic bottles and similar containers.

One object is to make sure that no obstruction will impede the closing of the mold.

Other objects of our invention center about the simplification of the manufacture of plastic bottles and the like by speeding up and facilitating the removal of the molded article from its mold.

Further objects of our invention will appear from the following description.

The specification is accompanied by a drawing in which:

Fig. 1 is a section in elevation through an extrusion device and a single-cavity mold; and Fig. 2 is a section in elevation through the same extrusion device but associated with a two-cavity mold.

Referring to the drawing in greater detail, and initially to Fig. 1, in an extrusion press 10, the extrusion nozzle 11 is annularly shaped. This nozzle, according to our invention, is formed by an outer ring 12 and an inner ring 13. The end portion 14 of a blow pipe 14' projects freely from within the inner ring 13 beyond the extrusion nozzle. The external diameter of the blow pipe being smaller than the internal diameter of the inner ring, there is a free annular space 15 between the blow pipe and the inner ring.

The provision of the annular aperture 15 constitutes an important feature of our invention inasmuch as it makes it possible for the blow pipe 14 to slightly move in any lateral direction when the mold is closed. This, for instance, is of importance to be sure to close the mold unobstructedly when the wall thickness and/or the temperature of the tube are not uniform over its entire circumference. The aperture 15 permits the blow pipe to move a little out of the way. It is true, such a lateral movement of the blow pipe causes a nonuniform wall thickness at the neck of the finished container, but this is of no practical significance since the wall thickness of the neck is usually anyhow greater than that of the body portion.

In accordance with another feature of the present invention, the blow pipe may also be made to be longitudinally movable in relation to the extrusion nozzle, and may, thus, be withdrawn with a more or lesser sudden movement, once the container has been molded, and the mold sections have been opened, or are being opened. The possibility of withdrawing the blow pipe proves particularly advantageous when the bottle or container neck is provided with internal threads or similarly projecting other parts. Practical experience has shown that the blow pipe may be retracted without any danger to the article immediately after molding since thermoplastic material which is generally used yields elastically to a sufficient degree while sufficiently warm.

It is a further feature of this invention that means may be provided to blow air through the annular aperture 15. The air is conducted through a passage 25 and passes over the external wall of the blow pipe and cools the blow pipe, preventing the plastic material from sticking to the blow pipe. This is a further expedient to thermally insulate the blow pipe and to protect it against heat transfer from hot plastic material, in addition to the separation of the blow pipe from the inner ring 13 of the extrusion nozzle by the annular gap 15.

The blow pipe may be of a jacketed construction and may be cooled, for example, by water. Air passing through the gap 15 will enhance the cooling effect of a cooling liquid, such as water.

The extrusion press 10 extrudes an open-ended tube 16 to vertically suspend from the extrusion nozzle 11 into the space between the sections 17 of a two-section mold. As soon as a sufficient length of tube is extruded, the two mold halves 17 which are provided with cutting edges 18 are moved toward one another. As opposing portions of the cutting edges meet, with extruded material between those portions, a segment of the tube is pinched off, and where two thicknesses of material are severed, they are simultaneously united. At the neck of the bottle to be formed, the material is firmly and tightly pressed against the external wall of the blow pipe 14. With the mold closed, it holds a completely closed hollow body of plastic material which can be expanded by any gaseous pressure medium, for instance, compressed air, admitted through the blow pipe. The hollow body expands to the shape of the mold cavity or inner wall 19 of the mold. Upon sufficient cooling, the mold 17 is opened, and the completed bottle will be withdrawn.

In Fig. 2, a mold 20 is shown which has two cavities 21 and 22, one arranged on top of the other, and separated by a partition 23. In this case, the cutting edges 18' extend over the abutting edges of the partition 23. In the apparatus of Fig. 2, an upper blow pipe designated 14 projects into the upper cavity 21, and a second blow pipe designated 24, which is located exactly opposite to, and aligned with, the upper blow pipe extends from below, and in a direction opposite to that of the upper blow pipe, into the lower cavity 22. A tube 16 which is again extruded from an extrusion nozzle 11 surrounds the blow pipe 14 and is slipped from above over the blow pipe 24 before the mold is closed. As the mold 20 closes, a section of the tube is being enclosed in each of the two cavities 21 and 22. The two tubular sections are then expanded, for instance, by compressed air against the internal surfaces of the mold, the air being blown in through the blow pipes 14 and 24.

From the foregoing description it will be apparent that the provision of the annular space between the inner ring of the two concentric rings which confine the extrusion orifice, and the blow pipe within the inner ring will make it possible for the mold to be unconstrainedly closed. The annular space per se, as well as air admitted therethrough, greatly contribute to the cooling of the respective blow pipe, thus preventing plastic material, while still soft, from sticking to the blow pipe. The blow pipe extending within the inner ring of the extrusion nozzle can, therefore, be easily withdrawn as long as the plastic material is still yielding, which facilitates the removal of the molded article. It will be understood that the blow pipe must be so dimensioned, and/or the nozzle and mold spatially so arranged, as to allow the withdrawal of the blow pipe.

While only two embodiments of the invention have been shown in the drawing and described in detail, it is to be understood that the invention is not limited to these precise embodiments. Instead, many changes and modifications, which are obvious to one skilled in the art, may be made without departing from the spirit of the invention as defined in the appended claims.

We claim:

1. Apparatus for the manufacture from plastics of bottles and other containers having a neck, including a sectional mold to form, when closed, a cavity for the article to be produced, an annular extrusion nozzle to extrude an open-ended tube to suspend vertically into the space between the open mold sections, the nozzle being formed by an outer and inner ring, said rings being concentric and spacedly arranged with respect to each other, and a blow pipe having a portion extending axially through the inner ring, and an end portion projecting beyond the extrusion nozzle into the mold cavity, the portion of the blow pipe extending through the inner ring having an external diameter smaller than the internal diameter of the inner ring, the end portion of the blow pipe having an external diameter substantially equal to the internal diameter of the neck of the article to be produced, the portion of the blow pipe extending through the inner ring and the inner ring defining an annular space, the blow pipe forming a conduit for a gaseous pressure medium to be led into the article to be blown, the mold sections being provided with edges to pinch the tube shut at a point remote from the nozzle, when the mold sections are closed over a segment of the tube, the mold sections, when being closed, forming in cooperation with the blow pipe the neck part of the article being produced.

2. In the apparatus according to claim 1, the blow pipe being longitudinally movable in relation to the extrusion nozzle.

3. In the apparatus according to claim 1, the blow pipe being transversally movable.

4. Apparatus for the manufacture from plastics of bottles and other containers having a neck, including a sectional mold to simultaneously and substantially form two articles one above the other, the mold, when closed, having two cavities one above the other, and a partition separating the cavities, an extrusion nozzle to extrude an open-ended tube to suspend vertically into the space between the open mold sections, the extrusion nozzle being formed by an outer and inner ring, said rings being concentric and spacedly arranged with respect to each other, an upper blow pipe, and a lower blow pipe, the upper blow pipe having a portion extending axially through the inner ring, and an end portion projecting beyond the extrusion nozzle into the upper mold cavity, the lower blow pipe extending from opposite the extrusion nozzle and in line with the upper blow pipe and having an end portion projecting into the lower mold cavity, the portion of the upper blow pipe extending through the inner ring having an external diameter smaller than the internal diameter of the inner ring, the end portion of each of the upper and the lower blow pipe having an external diameter substantially equal to the internal diameter of the neck of the respective article to be produced, the portion of the upper blow pipe extending through the inner ring and the inner ring defining an annular space, each of the blow pipes forming a conduit for a gaseous pressure medium to be led into the respective article to be blown, the partition being provided with edges to pinch the tube shut at two points, the mold sections forming in cooperation with the blow pipes the neck parts of the two articles being produced.

5. In the apparatus according to claim 1, means forming a passage to supply air through said annular space in the direction toward the article to be produced.

References Cited in the file of this patent

UNITED STATES PATENTS 2,461,630    Cozzo               Feb. 15, 1949

FOREIGN PATENTS 697,326    Great Britain        Sept. 23, 1953
156,324    Australia            May 4, 1954